US009226318B2

(12) United States Patent
Cavalcante et al.

(10) Patent No.: US 9,226,318 B2
(45) Date of Patent: Dec. 29, 2015

(54) COMMUNICATION EFFICIENCY

(71) Applicant: Nokia Technologies Oy, Espoo (FI)

(72) Inventors: Andre Mendes Cavalcante, Manaus (BR); Sayantan Choudhury, Berkeley, CA (US); Fabiano Chaves, Manus (BR); Esa Juhani Tuomaala, Emeryville, CA (US); Fuad Mousse Abinader, Jr., Manaus (BR); Erika Portela Lopes De Almeida, Manaus (BR); Robson Domingos Vieira, Brasília (BR); Klaus Franz Doppler, Albany, CA (US)

(73) Assignee: Nokia Technologies Oy, Espoo (FI)

( * ) Notice: Subject to any disclaimer, the term of this patent is extended or adjusted under 35 U.S.C. 154(b) by 127 days.

(21) Appl. No.: 14/020,348

(22) Filed: Sep. 6, 2013

(65) Prior Publication Data

US 2015/0071180 A1    Mar. 12, 2015

(51) Int. Cl.
*H04Q 9/00* (2006.01)
*H04W 74/08* (2009.01)

(52) U.S. Cl.
CPC .................................. *H04W 74/0816* (2013.01)

(58) Field of Classification Search
CPC .......... H04W 36/0083; H04W 74/085; H04W 84/20
USPC ......................... 370/329, 338; 455/446, 456.1
See application file for complete search history.

(56) References Cited

U.S. PATENT DOCUMENTS

2006/0209772 A1* 9/2006 Fang et al. ..................... 370/338
2010/0172296 A1* 7/2010 Singh et al. ................... 370/328

OTHER PUBLICATIONS

Agha et al., "Spatial Reuse in Wireless LAN Networks", Research Report, N° 3929,Networks and Systems, Projet HIPERCOM, May 2000, 12 pages.
"WaveLAN/IEEE Turbo 11 Mb PC Card Quick Installation Guide", Lucent Technologies, Sep. 22, 1999, 220 pages.
Pahlavan et al., "Wideband Local Access: Wireless LAN and Wireless ATM", IEEE Communications Magazine, vol. 35, Issue 11, Nov. 1997, pp. 34-40.
Calcev et al., "Sectorization for Hidden Node Mitigation", IEEE 802.11-12-0852-00-00ah, TGah Submission, Jul. 2012, pp. 1-13.
Wang et al., "Sectorized Beam Operation", IEEE 802.11-12/1103r0, Sep. 17, 2012, pp. 1-16.
Perahia et al., "Sectorized Beam Operation Follow Up", IEEE 802.11-12/1355r1, Nov. 11, 2012, pp. 1-24.
Wang et al., "Sectorized Beam Operation Follow Up", IEEE 802.11-12/1355r2, Nov. 8, 2012, pp. 1-21.
Wang et al., "Sectorization Follow Up 2", IEEE 802.11-11/0081r1, Jan. 10, 2013, pp. 1-40.

* cited by examiner

*Primary Examiner* — Wanda Z Russell
(74) *Attorney, Agent, or Firm* — Alston & Bird LLP

(57) ABSTRACT

There is provided a method, comprising: receiving, by a target node of a wireless access network, a signal from a first source node; determining the angular sector in which the first source node is located with respect to the target node; responding to the signal by both transmitting a first message omni-directionally and transmitting a second message directionally towards the angular sector; and establishing a first resource reservation on a frequency channel at least partly on the basis of transmitting the first message and the second message, wherein the first resource reservation is for performing directional data transfer with the first source node.

20 Claims, 4 Drawing Sheets

COMMUNICATION EFFICIENCY

FIELD

The invention relates generally to wireless access networks. More particularly, the invention relates to improving communication efficiency by enabling spatial channel reuse.

BACKGROUND

Wireless communication nodes, such as user terminals/stations and access points, may communicate with each other. Often the communication is performed on limited frequency resources. Therefore, channel spatial reuse may be used to increase the communication efficiency.

BRIEF DESCRIPTION OF THE INVENTION

According to an aspect of the invention, there are provided methods as specified in claims 1 and 6.

According to an aspect of the invention, there are provided apparatuses as specified in claims 11 and 16.

According to an aspect of the invention, there is provided a computer program product embodied on a distribution medium readable by a computer and comprising program instructions which, when loaded into an apparatus, execute the method according to any of the appended claims.

According to an aspect of the invention, there is provided a computer-readable distribution medium carrying the above-mentioned computer program product.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a network according to an embodiment;

DESCRIPTION OF EMBODIMENTS

Figure 1:
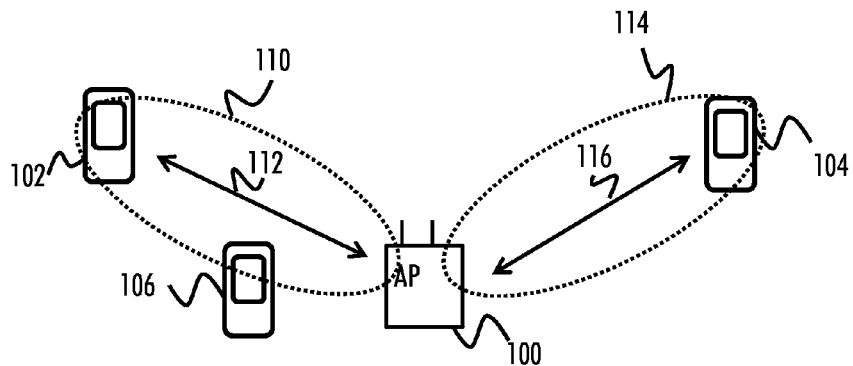

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The number of IEEE 802.11-enabled mobile devices is increasing. The IEEE 802.11 is a set of standards for implementing wireless local area network (WLAN), also known as the Wi-Fi. Such an IEEE 802.11-enabled station (STA), such as user terminals/equipment 102-106 in FIG. 1, may associate and communicate with an access node/point (AP) 100. The STAs 102-106 may comprise a mobile phone, a palm computer, a wrist computer, a laptop, a personal computer, or any device capable to access the wireless radio access network, such as the WLAN. The access node 100 may be a WLAN (IEEE 802.11) access point (e.g. Wi-Fi base stations), for example.

The AP 100 may perform communication with each of the STAs 102 to 106. However, often this takes place on different frequency channels which is not most efficient with respect to the use of scarce frequency resources. Thus, due to the increased demands for communication efficiency, solutions for improving the communication efficiency and resource reuse are being analyzed. As one possibility, a cell sectorization technique is proposed. For example, cell sectorization techniques may reduce co-channel interference, enhance the quality of service (QoS), and increase the channel capacity.

Spatial reuse of the medium may be one of the mechanisms to be exploited in sectorized operation under Wi-Fi networks. However, the associated signalling to manage the sectorized technique may be a challenging issue. This is because the signalling may need be robust and support typical Wi-Fi scenarios, which may include coexistence of sophisticated multi-antenna Wi-Fi standards (e.g., IEEE 802.11n, IEEE 802.11ac and IEEE 802.11ah) with legacy Wi-Fi networks, and Overlapping Basic Service Set (OBSSs) at the same channels. In general, sectorized Wi-Fi has so far been achieved only in planned networks which include site planning, for example. This limitation may cause the channel spatial reuse in Wi-Fi networks to be poor in effectiveness and strongly dependent on the traffic load and the Clear Channel Assessment (CCA) thresholds used to identify if the channel is busy or not.

Therefore, there is provided a Wi-Fi signalling method to enable channel spatial reuse through sectorized operation. Let us consider a situation depicted in FIGS. 1 and 2 in which a node, such as the STA 102 has data to be sent to the AP 100. The STA 102 may initiate the process by sending a signal to the AP in step 200A. In an embodiment, the signal carries a request for data transfer with the AP 100. The signal may be a single control frame requesting a transmission to a destination node (e.g., a ready-to-send (RTS) request/frame). A bit indicator in the RTS may be set to 0 to indicate that no additional control frame follows. In an embodiment, the signal is addressed to the AP 100. Such addressing may be indicated in the header of the signal.

As the AP 100 receives the RTS signal from the STA 102, the AP 100 may be called a target node of a wireless local area network whereas the STA 102 may be called a source node of the wireless local area network. However, it may be noted that in an embodiment, the target node 100 is not an access point (non-AP STA). This may be the case in a mesh networks, for example. Further, it may be noted that although so used in some embodiments, the source nodes 102 to 106 need not be non-AP STAs but may serve as APs (an AP STA). However, for the sake of simplicity, let us consider in the following that the target node 100 is an AP and the source nodes 102 to 104 are stations, such as STAs. In an embodiment, the target node is an access point of the IEEE 802.11. In an embodiment, the wireless access network is a wireless local area network of the IEEE 802.11. In an embodiment, the AP 100 and the STAs 102 to 106 all operate at least on a same specific frequency channel.

In step 203, the AP 100 may determine the angular sector in which the STA 102 is located with respect to the AP 100. This may be performed by any means known to a skilled person, such as by applying multiple antennas for the reception of the RTS signal from the STA 102. The AP 100 may apply, e.g., the phase differences experienced by each of the multiple antennas in determining the angle of arrival of the received RTS signal and, thus, consequently, the direction or angular sector in which the STA 102 is located. The angular sector may indicate the spatial sector in which the STA 102 is located in the azimuth and/or elevation direction. The angular sector may be determined with a predetermined accuracy. In an embodiment, the horizontal space of 360 degrees may be divided into three sectors, each spanning 120 degrees (1-120, 121-240, and 241-360 degrees, respectively). However, this is just a non-limiting example. The angular sectors may be wider or narrower than 60 degrees, and the number of the angular sectors may be more or less than three. For simplicity, however, let us assume that the AP 100 determines in step 203 that the STA 102 locates in the angular sector depicted with an ellipse 110 in FIG. 1.

Instead of transmitting a typical clear-to-send (CTS)—response to the STA 102, the AP 100 may respond to the RTS with a dual control frame structure. Such dual control frame structure may comprise two messages, a first message and the second message. In particular, the AP 100 may first transmit in step 204A the first message omni-directionally. Thus, each node in the coverage area of the first message may hear the first message, regardless of the directions in which the receiving nodes locate with respect to the AP 100.

Figure 2:
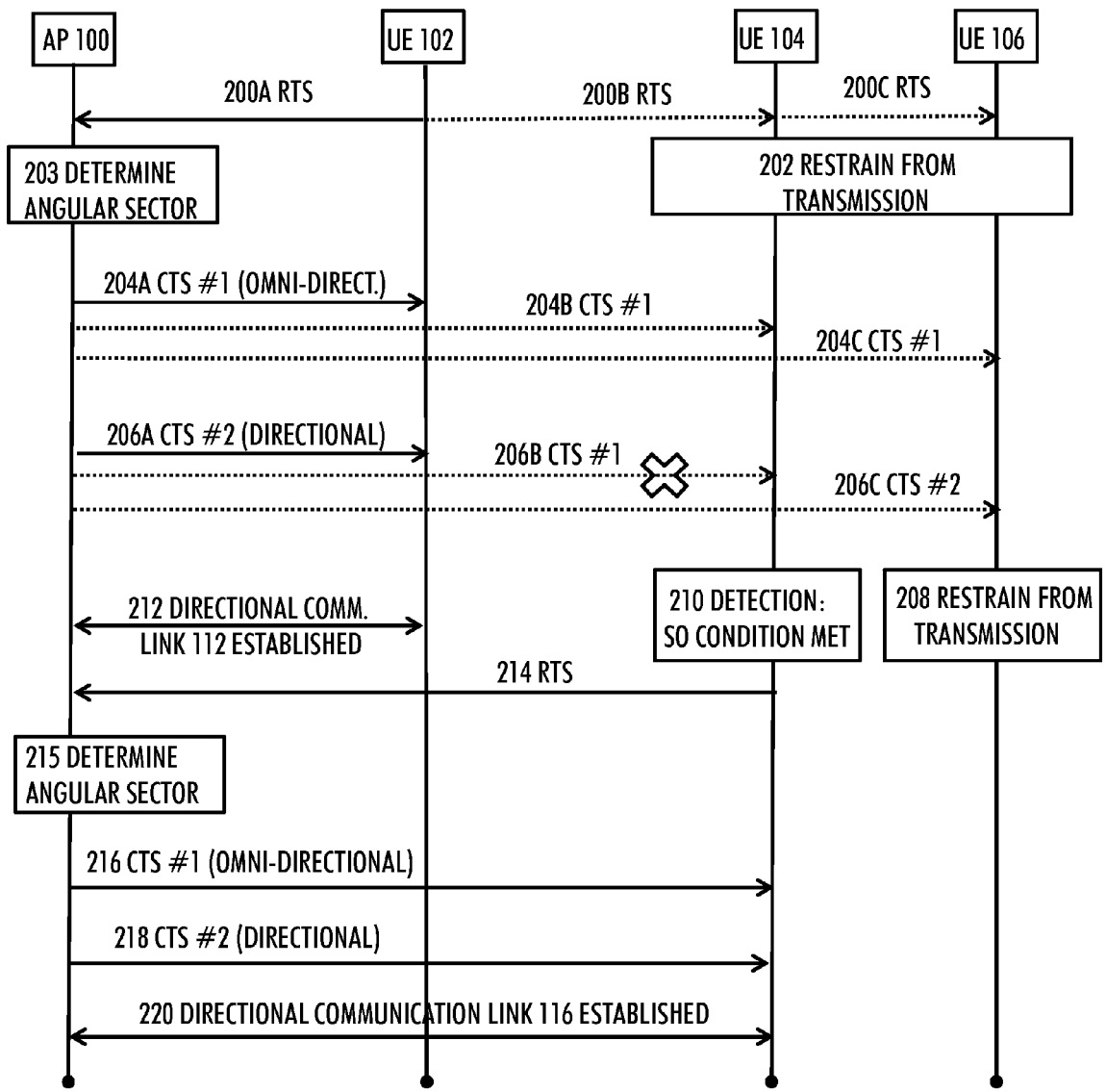
FIG. 2 shows a signaling flow diagram according to an embodiment.

In an embodiment, the first message is addressed to the STA 102, possibly as a response to the received RTS request. However, as shown in FIG. 2 with steps 204B and 204C, the STAs 104 and 106 may also receive this omni-directionally transmitted first message from the AP 100. Accordingly, these STAs 104 and 106 may then know who the intended receiver of the first message is.

In step 206A, the AP 100 transmits the second message directionally towards the angular sector in which the STA 102 is located with respect to the AP 100, i.e., in the sector 110 of FIG. 1. Step 206A may take place after a predetermined time period after the step 204A. This predetermined time period may be pre-coded to the nodes, obtained in an association procedure or received in a beacon signal, for example.

Figure 3:
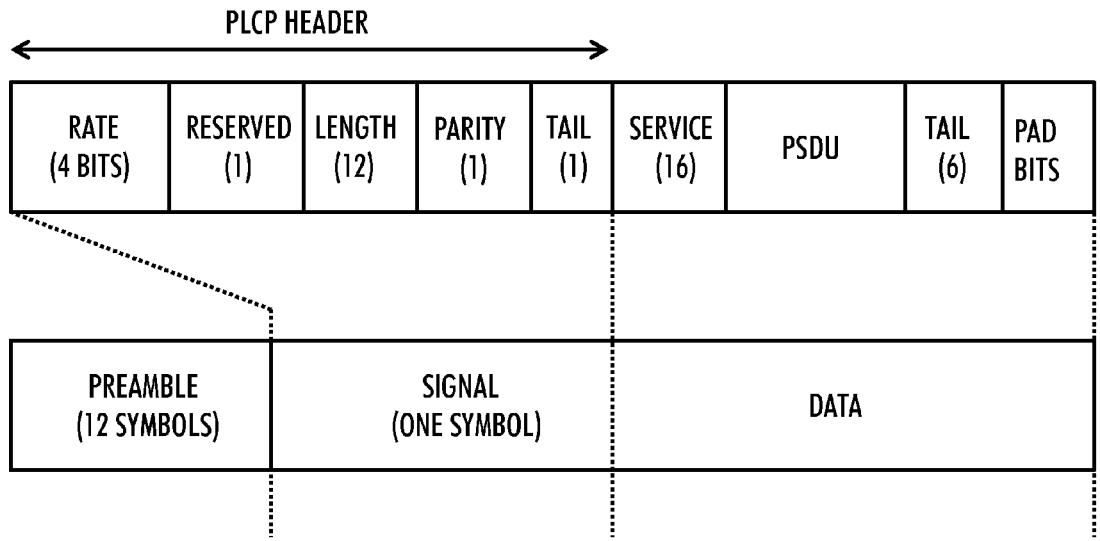
FIG. 3 shows a frame structure according to an embodiment.

In an embodiment, the first message carries an indication that the second message from the target node (AP 100) will follow and will be transmitted directionally. In an embodiment, the exact direction or angular sector of the directionally transmitted second message is not indicated. In another embodiment, the direction, e.g. the angular sector, is indicated in the first message. In an embodiment, the second message is addressed to the STA 102, possibly as a response to the received RTS request In an embodiment, the indication of the to-be-transmitted second message is given in a header of a physical layer convergence procedure (PLOP) frame of the first message. FIG. 3 depicts the frame format of the PLOP more clearly. Length of each field is given in the parenthesis, either in bits or in orthogonal frequency multiple access (OFDM) symbols. In an embodiment, the indication may be given in a Reserved-bit of the Signal-field of the PLOP header. The indication may be one bit. For example, bit "1" may indicate that a directionally transmitted second message will follow, whereas a bit "0" may indicate that no more control messages will follow.

In one embodiment, the default value for this Reserved-bit on the PLOP header is "1". In such case, value "0" may be used for the Reserved-bit in order to indicate that the directionally transmitted second message will follow. Otherwise, the bit value"1" may be used. This approach may be beneficial in that legacy devices may understand the first CTS message properly as a conventional CTS message.

In another embodiment, the indication that the directional second message will be transmitted after the omni-directional first message may be received as part of association procedure or as part of a beacon reception, for example.

In an embodiment the second message may comprise a bit indicator indicating that no further control messages follows. Such indicator may be for example "0" in the Reserved—field of the PLOP header of the second message.

In an embodiment, the first and second messages may have the same frame structure. In an embodiment, the first and second messages are control messages. In an embodiment, the first and second messages are CTS control messages.

After the STA 102 has received successfully also the second message in step 206A, the STA 102 and the AP 100 may establish in step 212 a first resource reservation on a specific frequency channel at least partly on the basis of transmitting the first message and the second message, wherein the first resource reservation is for performing directional data transfer by the AP 100 with the STA 102. Let us denote that this data transfer of the first resource reservation takes place on a first communication link 112. In other words, if the STA 102 is able to receive the dual control frame successfully, sectorized data transmission may be started between the STA 102 and the AP 100 in order to transfer data between these two nodes during a period defined in the dual control frame negotiation phase. It may be noted that the data transfer on the link 112 may be performed by the AP 100 towards the same angular sector as to which the second message from the AP 100 was transmitted.

The directional manner of transmitting and/or receiving data on the link 112 at least by the AP 100 may be advantageous because then the reception of data by the AP 100 may not be exposed to interference from other transmission(s) on the same frequency channel, provided that the other transmission(s) are not directed to the angular sector 110. In an embodiment, the AP 100 receives data only from the angular sector 110 in which the STA 102 is located. In an embodiment, the AP 100 transmits data only to the angular sector 110 in which the STA 102 is located. In an embodiment, also the STA 102 transmits and/or receives data to and/or from an angular sector in which the AP 100 is located.

As indicated above, the AP 100 may apply the first and second messages in forming the dual control frame, wherein the first message is transmitted in omni-directional manner and the following second frame transmission is done in a directional manner. As said, in an embodiment, the dual control frame represents a CTS message, either as a response to a RTS-request or to initiate a channel access, e.g. Transmit Opportunity (TxOP) protection, etc. Any legacy devices receiving either of the first and or second messages may defer channel access by the duration informed on either of the received messages. Further, the legacy STAs may ignore the Reserved-bit in PLOP header of the dual control messages/frames.

As shown with a reference numeral 206B, the STA 104 may not receive this second message from the AP 100 because the STA 104 is not located in the angular sector 110. However, in step 206C, the STA 106 may receive the second message from the AP 100 as the STA 106 locates in the angular sector 110. On the basis of such detections, the consecutive actions may be different by these two nodes 104 and 106.

For example, as the STA 106 receives also the second message in addition to the first message, the STA 106 may determine that its location with respect to the AP 100 is such that a possible communication between the STA 106 and the AP 100 on the same specific frequency would interfere with the first communication link 112 used by the AP 100 and the STA 102 locating in the direction of the directionally transmitted message. It may be that the two STAs 102 and 106 locate in the same angular sector 110 with respect to the AP 100, as is the case in FIG. 1. As a result, the STA 106 may in step 208 restrain from data transmissions for a period during which data transfer between the STA 102 and the AP 100 is ongoing. This is to ensure that the directional communication link 112 is not interfered by any transmission from the STA 106 on the same frequency channel. It may be noted that the STA 106 may continue/start transmitting data on a different frequency channel but not on the same channel as used in the communication link 112 between the STA 102 and the AP 100.

In order for the STA 106 to know how long it needs to restrain from transmitting data on this frequency, in an embodiment, the first and/or the second message may indicate a time period during which any node, other than the addressed STA 102, receiving the second message is not allowed to transmit data on the specific frequency channel. The restraining may be performed by the STA 106 e.g. setting a Network Allocation Vector (NAV) value of the STA 106 for the indicated duration. It is to be noted that the duration of sectorized operation communication is based on the amount the data to be transmitted. There may not be any fixed time period for it. In another embodiment, there is a fixed time period for restraining of the transmission and this fixed time period may be pre-coded in the nodes or received as part of beacon data or association procedure. In this way, the dual control frame is used to protect the channel for data transmission in the specific sector 110 during the period of time.

However, the STA 104 may not receive the second, directionally transmitted message from the AP 100 due to the location of the STA 104 with respect to the AP 100, as depicted in step 206B. In an embodiment, the STA 104 may wait for a predetermined period before determining that the second, directional message is not received. As shown in FIG. 1, the STA 104 may be located in an angular sector 114 which is different than the angular sector 110. Based on this, the STA 104 may determine in step 210 that there is significant directionality (i.e. antenna gain) in the current communication link 112 and a directional communication link between the STA 104 and the AP 100 would not interfere with the first communication link 112 from the STA 102 locating in the direction of the directionally transmitted message. This detection in step 210 may imply that a spatially-orthogonal (SO) requirement with respect to the STA 102 and with respect to the link 112 is met by the STA 104. Thereafter, the STA 104 and the AP 100 may establish a second resource reservation on the same frequency channel, wherein the second resource reservation is for performing directional data transfer by the AP 100 with the STA 104. Let us denote that this data transfer on the second resource reservation takes place on a second directional data communication link 116 between the AP 100 and the STA 104 on the same specific frequency channel.

This may consequently cause the AP 100 to perform parallel data transfers on the same specific frequency channel in different angular sectors 110 and 114. As such, spatial channel reuse is enabled. In this way the dual control frame approach may provide a mechanism for spatial channel reuse by nodes 102 and 104 defined as spatially-orthogonal with respect to each other. Further, the proposed dual control frame approach may provide for the spatial channel reuse at the receiver's end, i.e. at the target node 100.

The establishment of the communication link 116 may take place by the STA 104 resetting its NAV timer and then transmitting an RTS message to the AP 100 in step 214. As the AP 100 now receives a signal from the STA 104 which received the first, omni-directional message but not the second, directional message, the AP 100 may determine that the STA 104 is located such that the directional communication link 112 would not interfere with the second directional link 116. Therefore, the AP 100 may in step 215 determine the angular sector in which the STA 104 is located with respect to the AP 100. In step 220, the AP 100 may then establish the second directional communication link 116 with the STA 104 on the same specific frequency channel, thereby performing simultaneous parallel data communications on the same specific frequency channel to different angular sectors 110 and 114. This is because the two links 112 and 116 may coexist without interfering each other. The proposed dual control frame may thus provide means for resetting the NAV in the vicinity of the receiving AP 100 in order to perform data communication of another link on the same specific frequency channel.

In an embodiment, the AP 100 may also perform the dual control frame transmission for the STA 104 before establishing the communication link 116, as depicted in steps 216 and 218. This may be advantageous for at least two reasons. Firstly, to make sure that other nodes, possibly locating in the angular sector 116, do not cause interference to the established link 116, and secondly, to possibly find another STAs locating in a third, different angular sector which are possibly capable of reusing the same specific frequency channel.

In an embodiment, as shown with reference numerals 200B and 200C, the STAs 104 and 106 may also receive this RTS request from the STA 102 which is sent in step 200A. As the RTS may carry indication of the source STA 102 and the intended target AP 100, the STAs 104 and 106 acquire knowledge that the STA 102 requests communication establishment with the AP 100 on the specific frequency channel. Further, the STAs 104 and 106 may know that after the RTS request to the AP 100, the AP 100 will continue by performing the dual frame control signaling in steps 204A and 206A. Thus, the STAs 104 and 106 may restrain from transmitting data on the same specific frequency channel until the AP 100 has transmitted the first message and the second message in steps 204A and 206A, respectively. Such restraining may take place by the STAs 104 and 106 setting and keeping their NAV value for the provided duration until the Spatially-Orthogonal condition is evaluated by the AP 100. The period during which the STAs 104 and 106 restrain from transmitting to the frequency channel may be indicated in the RTS request, such as in the Duration—field of the RTS control frame.

In an embodiment, the STA 106 may check a BSS identifier (BSSID) and an ID of the STA 102 of the first and second messages. Alternatively, the BSSID may be replaced by an independent BSS ID, in case of adhoc network of STAs. Then the STA 106 may refrain from transmitting any messages to the AP 100 and to the STA 102 on the basis of detecting its own BSSID already during an active exchange of the messages. However, in order to enable the STA 104 to perform data transfer with the AP 100 regardless of the STA 104 detecting its own BSS in the first received first message, different options may be used. In an embodiment, each angular sector of the AP 100 may have a dedicated BSSID. In another embodiment, the AP 100 may indicate the to-be-used angular sector in the message(s) so that only STAs 104 in different sectors may decide to transmit data to the same AP 100. In another embodiment, the to-be-used angular section is used to determine beforehand whether or not a directionally transmitted second message from the target node is received. In yet one embodiment, the AP 100 may be able to resolve transmissions from different (possibly adjacent) angular sectors.

In an embodiment, the spatial channel reuse is performed within on basic service set (BSS). In another embodiment, the proposed spatial channel reuse mechanism is applied in overlapping BSSs (OBSSs).

Although described so that the second message is transmitted after the first message from the AP 100, in an embodiment, the second message is transmitted before the first message. That is, the order of the messages is changed. The STAs may acquire information during the association or in a beacon, wherein the information indicates that after the directional control message (second message) from an AP, the omni-directional control message (first message) will follow. In general, the information may indicate the order of the first and second messages. In this way the STAs may know, after receiving the omni-directional message, whether or not the STAs have missed the earlier transmitted directional message. After such detection, the operation of those STAs may be the same as depicted in FIG. 2 with respect to actions of the STA 104 or with respect to actions of the STA 106.

Regarding the sectorized operation of the nodes (such as of the AP 100), the AP 100 may apply for example independent transmitter (Tx)/receiver (Rx) chains for each sector, or the AP 100 may share the Tx/Rx chains amongst the sectors. In the latter case, it is possible that the second sector is activated only after, e.g., the RTS/CTS operation of the previous sector is completed.

In an embodiment, only the AP 100 applies directional (sectorized) communication by transmitting data directionally in the links 112 and/or 116. In an embodiment, the AP 100 may also receive data in directional manner. E.g. the AP 100 may apply a directional antenna mode when transmitting and/or receiving data. In this example embodiment, the STAs 102 to 106 may transmit data omni-directionally in the links 112/116. In another embodiment, also the STAs 102 to 106 may apply directional (sectorized operation) by transmitting and/or receiving data in a directional manner, instead of in an omni-directional manner.

Figure 4:
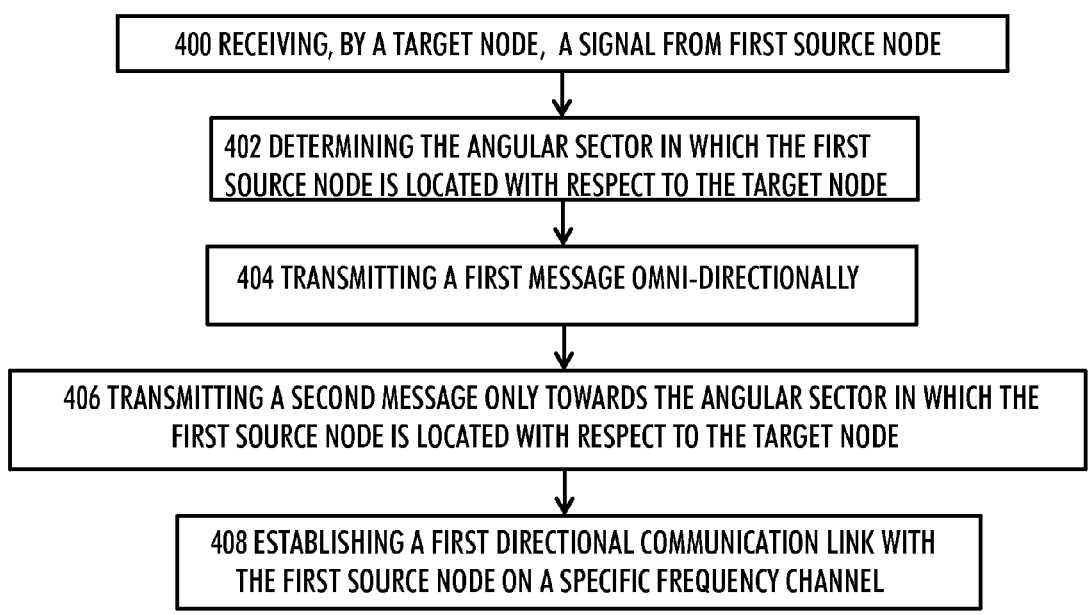
FIGS. 4 and 5 illustrate methods according to some embodiments.

FIG. 4 illustrates some of the functions performed by the AP 100, i.e. the target node of the wireless access network. In step 400, the AP 100 receives a signal from the STA 102. In step 402, the AP 100 determines the angular sector 110 in which the STA 102 is located with respect to the AP 100. The AP 100 may respond to the signal by, in step 404, transmitting the first message omni-directionally and in step 406, transmitting the second message directionally towards the angular sector 110. In step 408, the AP 100 and the STA 102 establish a first resource reservation on a frequency channel at least partly on the basis of transmitting the first message and the second message, wherein the first resource reservation is for performing directional data transfer between the AP 100 and the first STA 102.

Figure 5:
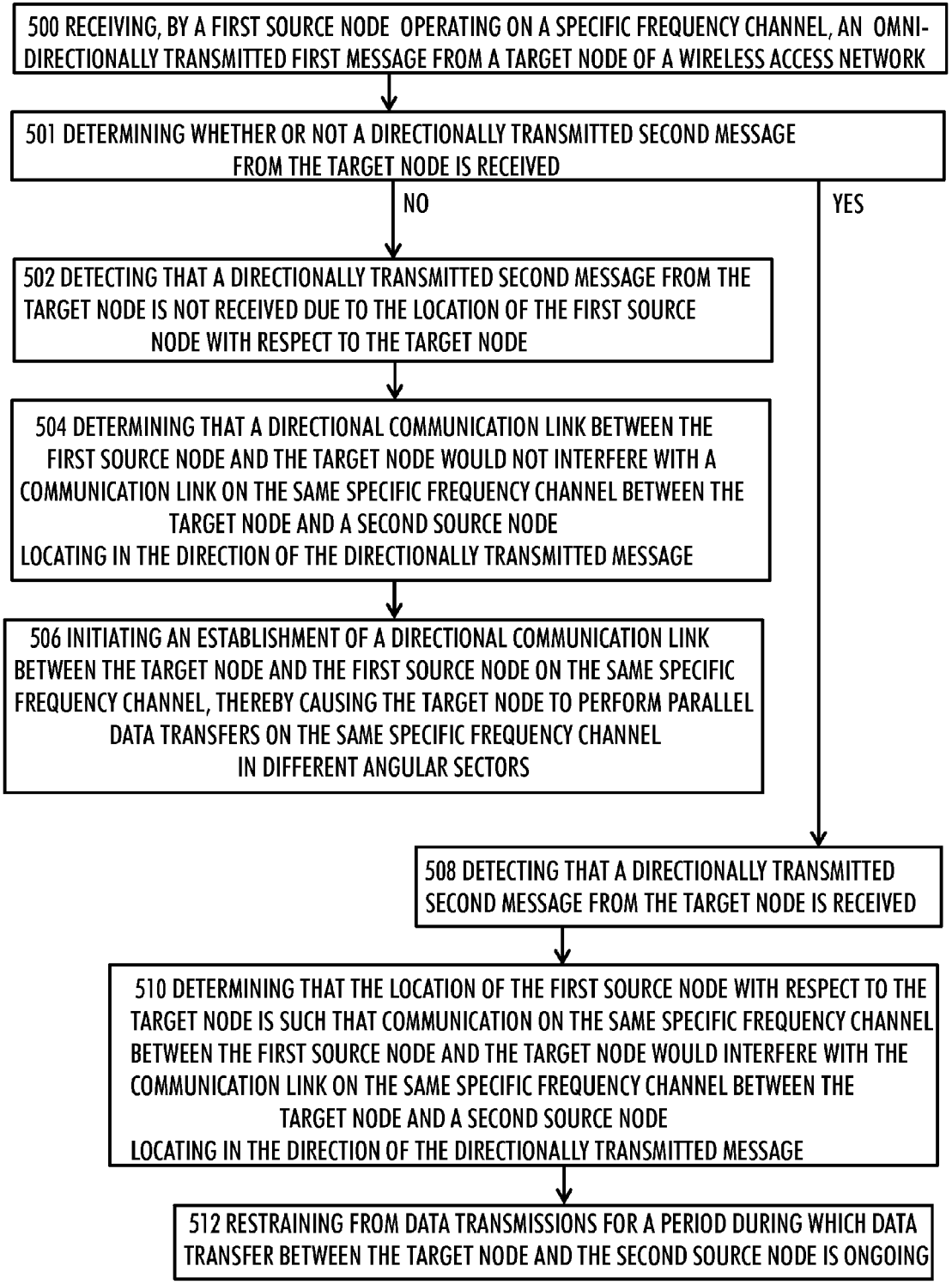

FIG. 5 illustrates some of the functions performed by the STA 104, i.e. one of the source nodes of the wireless access network. In step 500, the STA 104 receives the omni-directionally transmitted first message from the AP 100. Depending on whether the directionally transmitted second message is received or not in step 501, different actions may follow.

In case the second message is not received in step 502, the STA 104 may determine in step 504 that a directional data transfer between the STA 104 and the AP 100 would be spatially-orthogonal with respect to a directional communication link between the AP 100 and any STA (such as the STA 102) locating in the direction of the directionally transmitted second message. As a result, the AP 100 and the STA 104 may establish, in step 506, a resource reservation on the frequency channel, wherein the first resource reservation is for performing the directional data transfer between the STA 104 and the AP 100. Therefore, some of the operations of the STA 104, based on the detection that the second message is not received, are depicted in steps 502 to 506.

However, in case the second message is received by the STA 104 in step 508, the STA 104 may in step 510 determine that the spatially orthogonal requirement is not met. As a result, in step 510, the STA 104 may restrain from data transmissions on the same specific frequency channel for a period during which data transfer between the target node and the second source node is ongoing. Therefore, some of the operations of the STA 104, based on the detection that the second message is received, are depicted in steps 508 to 512.

Figure 6:
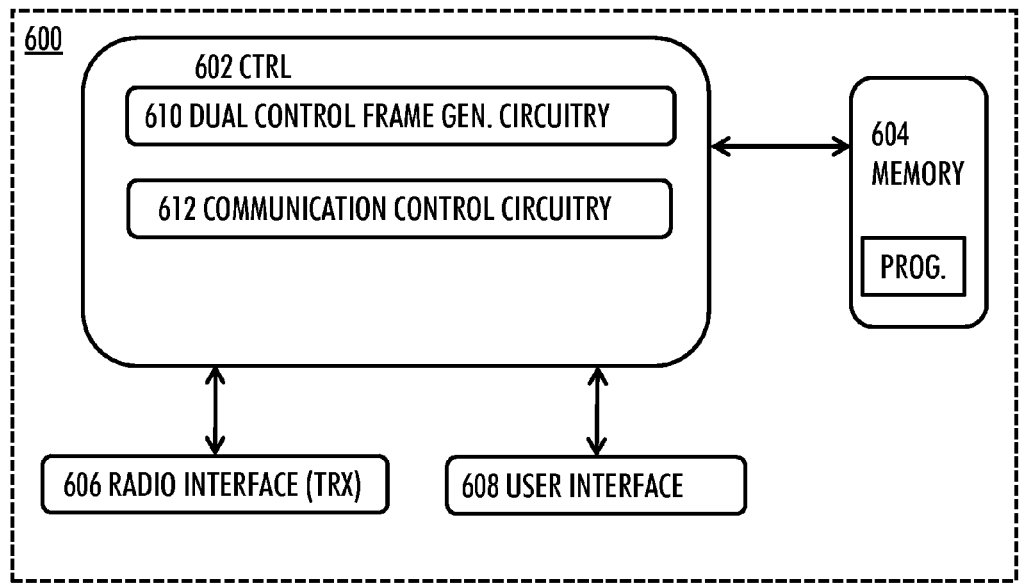
FIGS. 6 and 7 depict apparatuses according to some embodiments.
Figure 7:
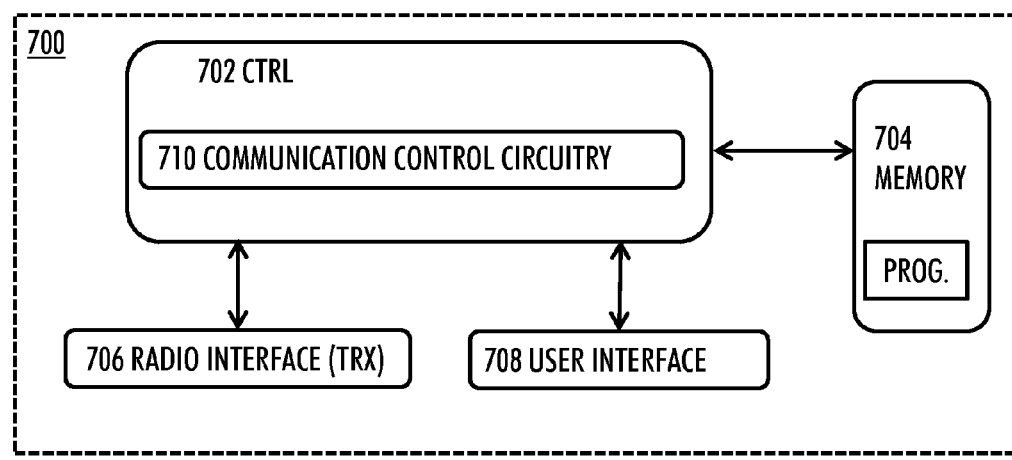

FIGS. 6 to 7 provide apparatuses 600 and 700 comprising a control circuitries (CTRL) 602, 702, such as at least one processor, and at least one memory 604, 704 including a computer program code (PROG), wherein the at least one memory and the computer program code (PROG), are configured, with the at least one processor, to cause the respective apparatus 600, 700 to carry out any one of the embodiments described. The memory 604, 704 may be implemented using any suitable data storage technology, such as semiconductor based memory devices, flash memory, magnetic memory devices and systems, optical memory devices and systems, fixed memory and removable memory.

The apparatuses 600 and 700 may further comprise communication interfaces (TRX) 606, 706 comprising hardware and/or software for realizing communication connectivity according to one or more communication protocols. The TRX may provide the apparatus with communication capabilities to access the radio access network, for example.

The apparatuses 600 and 700 may also comprise user interfaces 608, 708 comprising, for example, at least one keypad, a micro-phone, a touch display, a display, a speaker, etc. Each user interface may be used to control the respective apparatus by the user.

In an embodiment, the apparatus 600 may be or be comprised in a base station or access node/point of a wireless network, such as WLAN (IEEE 802.11). In an embodiment, the apparatus 600 is or is comprised in the access node/point 100. However, in an embodiment, the apparatus 600 is comprised in a non-AP wireless station, such as in a STA.

The control circuitry 602 may comprise a dual control frame generation circuitry 610 for performing the functionalities related to the generation of the first message and of the second message, according to any of the embodiments. A communication control circuitry 612 may be, e.g., for establishing the angular sector from which data is received and/or transmitted, for performing omni-directional transmission of the first message for performing directional transmission of the second message, and for applying the directional data communication link 112/116.

In an embodiment, the apparatus 700 may comprise the terminal device of a wireless network system, e.g. a user equipment (STA), a user terminal (UT), a computer (PC), a laptop, a tabloid computer, a cellular phone, a mobile phone, a communicator, a smart phone, a palm computer, or any other communication apparatus. Alternatively, the apparatus 700 is comprised in such a terminal device. Further, the apparatus 700 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 700 may be, comprise or be comprised in a wireless device, such as the STA/STA 104. However, in an embodiment, the apparatus 700 may be comprised in an access point of the IEEE 802.11, for example.

The control circuitry 702 may comprise a communication control circuitry 710 for determining whether to start or to restrain from data communication. The communication control circuitry 710 may also be responsible of determining the angular direction to which the directional communication link is to be established towards the AP 100, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
receiving, by a target node of a wireless access network, a signal from a first source node;
determining an angular sector in which the first source node is located with respect to the target node;
responding to the signal by both transmitting a first message omni-directionally and transmitting a second message directionally towards the angular sector; and
establishing a first resource reservation on a frequency channel at least partly on the basis of transmitting the first message and the second message, wherein
the first message comprises an indication of the second message being transmitted directionally towards the angular sector; and
the first resource reservation is for performing directional data transfer with the first source node.

2. The method of claim 1, wherein the first message carries an indication that a second message will follow.

3. The method of claim 1, wherein the received signal is a ready-to-send-request for a communication link establishment, and wherein the first message and the second message form a clear-to-send-response.

4. The method of claim 1, wherein the first and/or the second message indicates a time period during which any node, other than the addressed first source node, receiving also the directionally transmitted second message is not allowed to transmit data on the frequency channel.

5. The method of claim 1, further comprising:
receiving another signal from a second source node which received the omni-directionally transmitted first message but not the directionally transmitted second message;
determining that the second source node is located so that the first resource reservation would not interfere with a directional data transfer to be performed by the target node with the second source node;
determining the angular sector in which the second source node is located with respect to the target node; and
establishing a second resource reservation on the frequency channel, wherein the second resource reservation is for performing directional data transfer with the second source node, thereby performing parallel data transfers on the same frequency channel to different angular sectors.

6. A method, comprising:
receiving, by a first source node operating on a frequency channel, an omni-directionally transmitted first message from a target node of a wireless access network;
determining whether or not a directionally transmitted second message from the target node is received; and upon detecting that the directionally transmitted second message from the target node is not received, performing the following:

determining, on the basis of the detection, that directional data transfer performed by the target node with the first source node would not interfere with directional data transfer on the same frequency channel performed by the target node with a second source node locating in the direction of the directionally transmitted message; and establishing a first resource reservation on the frequency channel, wherein the first message comprises an indication of the second message being transmitted directionally towards the angular sector; and the first resource reservation for performing the directional data transfer by the target node with the first source node, thereby causing the target node to perform parallel data transfers on the same frequency channel in different angular sectors.

7. The method of claim 6, wherein the first message carries an indication that the second message from the target node will follow.

8. The method of claim 6, further comprising:
transferring data directionally on the first resource reservation between the first source node and the target node.

9. The method of claim 6, further comprising:
upon detecting that the directionally transmitted second message from the target node is received, performing the following:

determining that the location of the first source node with respect to the target node is such that directional data transfer on the same frequency channel by the target node with the first source node would interfere with the directional data transfer on the same frequency channel by the target node with the second source node locating in the direction of the directionally transmitted message; and restraining from data transmissions on the same frequency channel for a period during which data transfer between the target node and the second source node is ongoing.

10. The method of claim 6, wherein the wireless access network is a wireless local area network of the IEEE 802.11, and the target node is an access point of the IEEE 802.11.

11. An apparatus, comprising:
at least one processor and at least one memory including a computer program code, wherein the at least one memory and the computer program code are configured, with the at least one processor, to cause a target node of a wireless access network at least to:
receive a signal from a first source node;
determine an angular sector in which the first source node is located with respect to the target node;
respond to the signal by both transmitting a first message omni-directionally and transmitting a second message directionally towards the angular sector; and
establish a first resource reservation on a frequency channel at least partly on the basis of transmitting the first message and the second message, wherein the first message comprises an indication of the second message being transmitted directionally towards the angular sector; and the first resource reservation is for performing directional data transfer with the first source node.

12. The apparatus of claim 11, wherein the first message carries an indication that a second message will follow.

13. The apparatus of claim 11, wherein the received signal is a ready-to-send-request for a communication link establishment, and wherein the first message and the second message form a clear-to-send-response.

14. The apparatus of claim 11, wherein the first and/or the second message indicates a time period during which any node, other than the addressed first source node, receiving also the directionally transmitted second message is not allowed to transmit data on the frequency channel.

15. The apparatus of claim 11, wherein the at least one memory and the computer program code are configured, with the at least one processor, to cause the target node further to:
receive another signal from a second source node which received the omni-directionally transmitted first message but not the directionally transmitted second message;
determine that the second source node is located so that the first resource reservation would not interfere with a directional data transfer to be performed by the target node with the second source node;
determine the angular sector in which the second source node is located with respect to the target node; and
establish a second resource reservation on the frequency channel, wherein the second resource reservation is for performing directional data transfer with the second source node, thereby performing parallel data transfers on the same frequency channel to different angular sectors.

16. An apparatus, comprising:
at least one processor and at least one memory including a computer program code, wherein the at least one memory and the computer program code are configured, with the at least one processor, to cause a first source node at least to:
receive an omni-directionally transmitted first message from a target node of a wireless access network, wherein the first source node operates on a frequency channel;
determine whether or not a directionally transmitted second message from the target node is received; and
upon detecting that the directionally transmitted second message from the target node is not received, perform the following:

determine, on the basis of the detection, that directional data transfer performed by the target node with the first source node would not interfere with directional data transfer on the same frequency channel performed by the target node with a second source node located in the direction of the directionally transmitted message; and establish a first resource reservation on the frequency channel, wherein the first message comprises an indication of the second message being transmitted directionally towards the angular sector; and the first resource reservation for performing the directional data transfer by the target node with the first source node, thereby causing the target node to perform parallel data transfers on the same frequency channel in different angular sectors.

17. The apparatus of claim 16, wherein the first message carries an indication that the second message from the target node will follow.

18. The apparatus of claim 16, wherein the at least one memory and the computer program code are configured, with the at least one processor, to cause the first source node further to:
transfer data directionally on the first resource reservation between the first source node and the target node.

19. The apparatus of claim 16, wherein the at least one memory and the computer program code are configured, with the at least one processor, to cause the first source node further to:
  upon detecting that the directionally transmitted second message from the target node is received, perform the following:
  determine that the location of the first source node with respect to the target node is such that directional data transfer on the same frequency channel by the target node with the first source node would interfere with the directional data transfer on the same frequency channel by the target node with the second source node locating in the direction of the directionally transmitted message; and
  restrain from data transmissions on the same frequency channel for a period during which data transfer between the target node and the second source node is ongoing.

20. The apparatus of claim 16, wherein the wireless access network is a wireless local area network of the IEEE 802.11, and the target node is an access point of the IEEE 802.11.

\* \* \* \* \*